C. SMITH.
INDIRECT WATER HEATING APPARATUS.
APPLICATION FILED MAY 6, 1919.
1,379,581. Patented May 24, 1921.
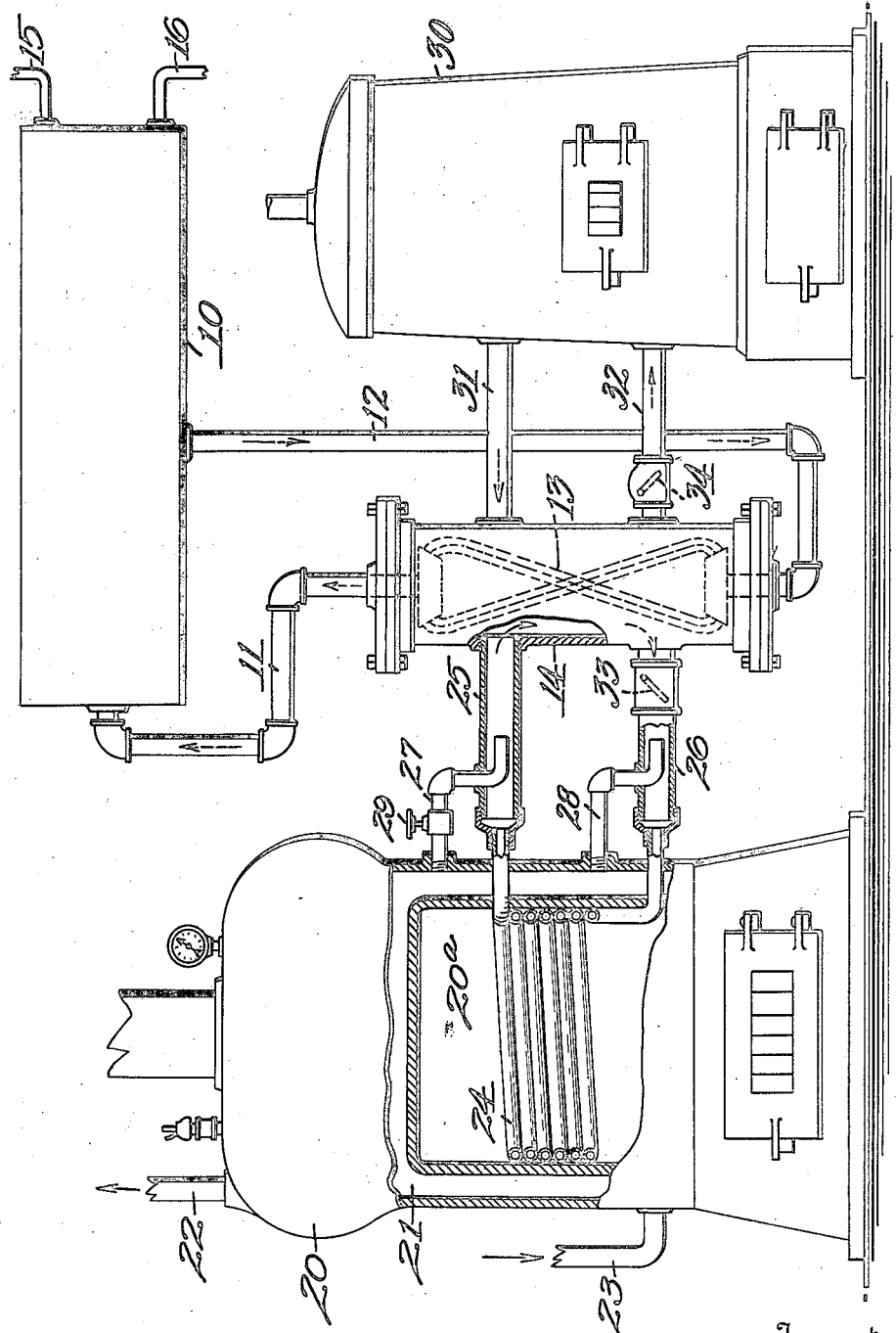
Inventor
Chetwood Smith
By his Attorneys
Southgate & Southgate
Witness
C. F. Wesson.

UNITED STATES PATENT OFFICE.

CHETWOOD SMITH, OF WORCESTER, MASSACHUSETTS, ASSIGNOR TO STACK HEATER COMPANY, OF BOSTON, MASSACHUSETTS, A CORPORATION OF MASSACHUSETTS.

INDIRECT WATER-HEATING APPARATUS. REISSUED 1,379,581.　　　　Specification of Letters Patent.　　Patented May 24, 1921.

Application filed May 6, 1919. Serial No. 295,219.

*To all whom it may concern:*

Be it known that I, CHETWOOD SMITH, a citizen of the United States, residing at Worcester, in the county of Worcester and State of Massachusetts, have invented a new and useful Indirect Water-Heating Apparatus, of which the following is a specification.

This invention relates to water heating apparatus of the type in which the water is heated indirectly by the circulation of hot water in contact with containers of the water to be heated, but not in open communication therewith.

One object of my invention is to provide a construction by which two separate heating devices may be used for heating the circulating water, each device being connected by circulation pipes to an indirect heating chamber, in combination with means to prevent circulation of water between the two heating devices.

Another object of my invention is to provide a construction in an indirect heating apparatus by which an auxiliary heating device may be used in a steam or hot water house heater, the auxiliary device being connected by circulation pipes to an indirect heating chamber, and having branch connections to the water space of the house heater whereby interchange of heat may at times occur.

With these general objects in view, my invention consists in arrangements and combinations of parts in an indirect heating apparatus which will be hereinafter described and more particularly pointed out in the appended claims.

A preferred form of my invention is shown in the drawing which is a front elevation, partly in section, of my improved heating apparatus.

In this drawing I have shown a hot water storage tank 10, connected by suitable pipes 11 and 12 to the ends of a heating coil 13 disposed in an indirect heating chamber 14. A distributing pipe 15 and supply pipe 16 are connected to the tank 10 as usual.

A steam or hot water house heater is shown at 20, having a water space 21, and provided with circulation pipes 22 and 23. Any suitable auxiliary heating device, such as a coil 24, is disposed within the heater 20 or its firebox 20ª and pipes 25 and 26 extend from the device 24 to the chamber 14.

Branch pipes 27 and 28 connect the water space 21 to the pipes 25 and 26, the ends of the pipes 27 and 28 extending a certain distance within the pipes 25 and 26 toward the chamber 14. A valve 29 is provided in the pipe 27 by which the flow of water therethrough may be controlled.

The numeral 30 indicates an additional water heater of any convenient form, intended for use when the house heater is not in operation. The auxiliary heater 30 is connected by pipes 31 and 32 to the indirect heating chamber 14. Check valves 33 and 34 are provided in the pipes 26 and 32, each check valve opening away from the heating chamber 14.

With this construction it will be seen that hot water for the heating chamber 14 may be provided from the large heater 20 or from the smaller auxiliary heater 30, and that the arrangement of piping shown herein prevents interchange of heat between the heating chamber 14 and either of the heaters which is not in operation.

If the heater 30 is in use, the hot water will flow through the pipe 31 and the cooled water will return to the heater 30 through the pipe 32, the check valve 34 allowing the passage of water in this direction. If, however, the hot water in the chamber 14 shows any tendency to circulate through the heater 20, the check valve 33 prevents the return of cooler water to the chamber 14, and thus effectually prevents interchange of heat between the heater 30 and the cold water in the heater 20. If the heater 20 is in operation and the water in the heater 30 is cold, the operation will be reversed and circulation of water through the heater 30 will be prevented by the check valve 34. It is thus possible to use either or both heaters as desired, and loss of heat to cooler water is prevented.

Special advantages also result from the use of the branch connections shown between the auxiliary heater 24 and the heater 20, formed by extending the pipes 27 and 28 into the pipes 25 and 26. Under normal conditions of operation, the water in the coil 24 will be at a considerably higher temperature than the water in the large heater 20, as the coil is in more direct contact with the fire.

If the difference in temperature is not too great, the water circulates as indicated by arrows in the drawing, and raises the temperature of the water in the tank 10. If, however, only a small quantity of water is being drawn from the tank, the temperature of the water in the coil 24 and in the chamber 14 may be materially above the temperature of the water in the heater 20.

When this occurs, the direction of flow of the water leaving the coil 24 is reversed in the pipes 25 and the highly heated water passed through the branch pipe 27 to the water space 21. At the same time a portion of the cooler water in the heater 20 passes out through the branch pipe 28 and returns to the coil through the pipe 26. The excess of heat in the coil 24 is thus distributed through the large volume of water in the heater 20, and undue rise of temperature in the coil 24 or in the chamber 14 is prevented. This system of connections also renders unnecessary the provision of gages or relief valves on the chamber 14 as the usual relief devices on the large heater answer all purposes.

The difference in temperature necessary to cause such heat interchange depends to a large extent upon the extension of the pipes 27 and 28 toward the chamber 14.

Having thus described my invention, it will be seen that changes and modifications can be made therein by those skilled in the art within the scope of my invention as expressed in the claims, and I do not wish to be otherwise limited to the details herein disclosed, but what I claim is:—

1. Indirect water heating apparatus comprising an indirect heating chamber, a main water heater, an additional heating device capable of heating water to a higher temperature, and connections permitting the flow of water from said device to said heating chamber under normal conditions and permitting the flow of water from said device to said main heater whenever the temperature of the water in said additional heating device and said heating chamber materially exceeds the temperature of the water in said main heater.

2. Indirect water heating apparatus comprising an indirect heating chamber, a relatively small water heating device, pipes connecting said device to said chamber, a relatively large main water heater, and branch connections from said pipes to said main water heater.

3. Indirect water heating apparatus comprising a main water heater connected to a building heating system, an indirect heating chamber, an additional water heating device associated with said water heater, circulation pipes from said device to said indirect heating chamber, and branch connections from said main water heater to said pipes.

4. Indirect water heating apparatus comprising an indirect heating chamber, a main water heater, an additional heating device capable of heating water to a higher temperature, upper and lower passages connecting said additional heating device to said indirect heating chamber and branch pipes connecting said passages to said main water heater, said pipes being extended into and along said passages in a direction away from said additional heating device.

In testimony whereof I have hereunto affixed my signature.

CHETWOOD SMITH.